(12) United States Patent
Scannell et al.

(10) Patent No.: US 10,435,166 B2
(45) Date of Patent: Oct. 8, 2019

(54) COWLING WITH STRUCTURAL HAND HOLDS OPERATING ALSO AS MAINTENANCE POSITION BUMPERS

(71) Applicant: Bell Helicopter Textron Inc., Fort Worth, TX (US)

(72) Inventors: Brent Scannell, Quebec (CA); Jean Pierre Paradis, Sainte Therese (CA); Thomas Mast, Carrollton, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 325 days.

(21) Appl. No.: 15/597,886

(22) Filed: May 17, 2017

(65) Prior Publication Data
US 2018/0334260 A1 Nov. 22, 2018

(51) Int. Cl.
| | | |
|---|---|---|
| *B64D 29/06* | (2006.01) | |
| *B64D 29/08* | (2006.01) | |
| *B64C 1/14* | (2006.01) | |
| *B64D 41/00* | (2006.01) | |

(52) U.S. Cl.
CPC ............ *B64D 29/08* (2013.01); *B64C 1/1446* (2013.01); *B64D 29/06* (2013.01); *B64D 41/00* (2013.01)

(58) Field of Classification Search
CPC ...... B64C 1/1446; B64D 29/06; B64D 29/08; B64D 41/00
USPC ............................................... 244/58
See application file for complete search history.

(56) References Cited

U.S. PATENT DOCUMENTS

| | | | | |
|---|---|---|---|---|
| 8,113,767 B2* | 2/2012 | Brill | ................... | B64D 41/00 244/58 |
| 2009/0261208 A1* | 10/2009 | Belyew | ................. | B01D 46/10 244/53 B |
| 2015/0115099 A1* | 4/2015 | Payangapadan | ...... | B64C 1/0009 244/58 |
| 2018/0057183 A1* | 3/2018 | Le Cadet | ............... | B64D 29/06 |

FOREIGN PATENT DOCUMENTS

| | | |
|---|---|---|
| DE | 630236 | 5/1936 |
| DE | 749206 | 11/1944 |
| EP | 3059157 A1 | 8/2016 |

(Continued)

OTHER PUBLICATIONS

EPO Search Report issued in EP Application 17185782.4 dated Mar. 20, 2018, 4 pages.

(Continued)

*Primary Examiner* — Claude J Brown
(74) *Attorney, Agent, or Firm* — Patent Capital Group (57) ABSTRACT

An example cowling for a rotorcraft is hinged on a stationary part of an airframe of the rotorcraft and is pivotable from a closed position into a first partially open position and thereafter into a second fully open position. The example cowling includes a rod articulated on the cowling and having a free end configured to releasably engage with the airframe to hold the cowling in the first position; and at least one handhold attached to an exterior surface of the cowling, wherein the at least one handhold has a substantially straight section that in the fully open position rests on a top portion of the airframe so as to more evenly distribute the weight of the cowling on the airframe.

20 Claims, 7 Drawing Sheets

(56) References Cited

FOREIGN PATENT DOCUMENTS

EP        3403919 A1    11/2018

OTHER PUBLICATIONS

EPO Examination Report issued in EP Application 17185782.4 dated Apr. 11, 2018, 6 pages.
Bell 525 Relentless (Product Diagram), Bell Helicopter, a Textron Company; Flight International from Flightglobal, Tim Hall (FRAeS, Fort Worth, Texas), Reed Business Information, Published Nov. 12, 2014. (1 page).
Perry, Dominic, "Analysis: Bell 525 Relentless Cutaway and Technical Description", Flight Global, Flight International, Bell Helicopter, Published Nov. 12, 2014. (8 pages).

* cited by examiner

COWLING WITH STRUCTURAL HAND HOLDS OPERATING ALSO AS MAINTENANCE POSITION BUMPERS

TECHNICAL FIELD

This disclosure relates to a cowling of a rotorcraft having structural handholds that can operate also as maintenance position bumpers.

BACKGROUND

Some rotorcrafts include cowlings configured to act as a protective fairing around propulsion related components, auxiliary power units (APU) and environmental control units (ECU). For example, a fairing may be used for general drag reduction, but also for providing an aerodynamic flow path from the exterior of the cowling to the engine inlet engine as well as for decorative purposes. In some rotorcraft configurations, APUs and internal ducts, often for cooling purposes, are arranged aft of the engine underneath the fairing. The components located underneath the fairing require occasional or periodic inspection and maintenance which necessitates at least partial removal of the fairing. In some configurations, fairings are hinged on a stationary part of the fuselage. The terms cowling and fairing may be used interchangeably in the context of this disclosure.

SUMMARY

This disclosure relates to a cowling of a rotorcraft having structural handholds that can operate also as maintenance position bumpers.

One innovative aspect of the subject matter described herein can be implemented as a cowling for a rotorcraft, wherein the cowling is hinged on a stationary part of an airframe of the rotorcraft and pivotable from a closed position into a first partially open position and into a second fully open position. The cowling includes a rod that is articulated on the cowling and has a free end configured to releasably engage with the airframe to hold the cowling in the first position. The cowling furthermore includes at least one handhold attached to an exterior surface of the cowling, wherein the at least one handhold is configured to rest on a top portion of the airframe in the fully open position.

This, and other aspects, may include one or more of the following features. The handhold may have an elongated, substantially straight section that is shaped and angled with respect an exterior contact surface of the cowling such that a tangent extending through the straight section extends through a hinge connecting the cowling to the top portion of the airframe. The handhold may bridge an opening in a lengthwise direction of the rotorcraft, wherein the opening may be aligned with an air inlet of the component of the rotorcraft, such as an auxiliary power unit (APU).

To hold the cowing securely in the first position, the airframe may have a suitable receptacle, for example a key slot configured to engage with the free end of the rod in the first position. In the closed position, the cowling may be secured on the airframe with one or more latches.

Another innovative aspect of the subject matter described herein can be implemented as a rotorcraft that includes the aforedescribed cowling. Still another innovative aspect of the subject matter described herein can be implemented as a method for facilitating access to a component of a rotorcraft disposed underneath a cowling. The method includes allowing maintenance personnel to grasp at least one handhold attached to an exterior surface of the cowling and climb up to a platform; opening the cowling to a first partially open position and supporting the cowling on an airframe of the rotorcraft in the first partially open position; and opening the cowling from the first position to a second fully open position, wherein in the second position the at least one handhold rests on a top portion of the airframe.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Like reference numbers and designations in the various drawings indicate like elements. Moreover, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1:
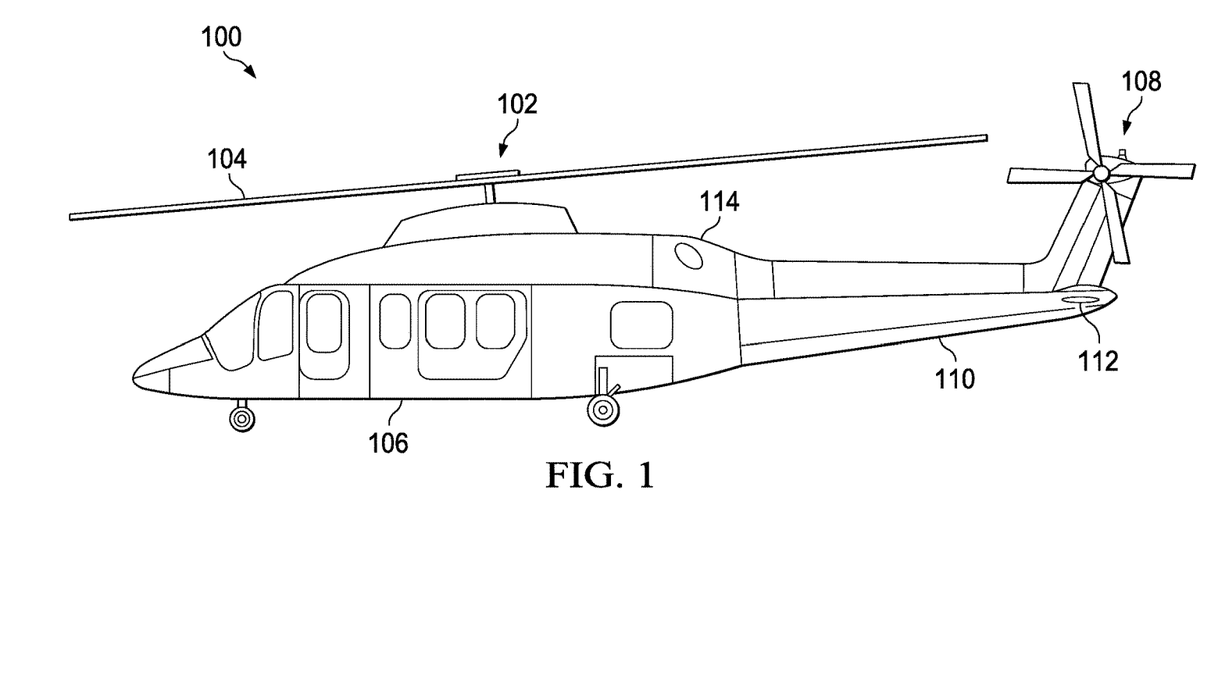
FIG. 1 illustrates an example rotorcraft in accordance with certain embodiments.

FIG. 1 illustrates an example embodiment of a rotorcraft 100. The illustrated example portrays a side view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, tail rotor or anti-torque system 108, an empennage 110, and a tail structure 112. In the illustrated embodiment, the tail structure 112 may also include a horizontal stabilizer. Torque is supplied to rotor system 102 and to the anti-torque system 108 using at least one engine. The rotorcraft may also include a variety of cowling assemblies (or cowlings) configured to cover components of the rotorcraft and reduce aerodynamic drag. One example cowling 114 arranged aft of an unillustrated aircraft component may cover and protect, for example, an auxiliary power unit (APU).

It should be appreciated that rotorcraft 100 of FIG. 1 is merely illustrative of a variety of aircraft that can be used to implement embodiments of the present disclosure. Other aircraft implementations can include, for example, fixed wing airplanes, hybrid aircraft, tiltrotor aircrafts, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

Figure 2:
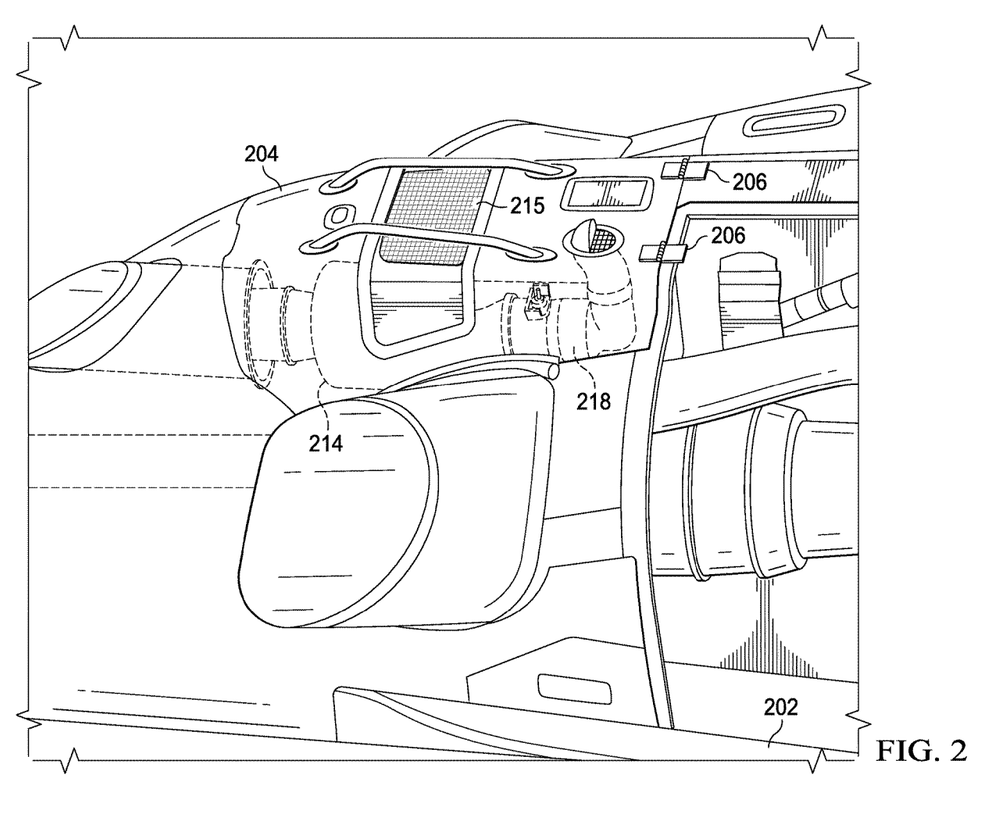
FIG. 2 is a perspective cutout view of an example cowling attached to the fuselage.

FIG. 2 shows in a perspective, partially cutout view an example cowling 204 that is attached by a hinges 206 to the fuselage 106 of the rotorcraft 100. Components of the rotorcraft covered by the cowling 204 and schematically indicated in FIG. 2 may include an APU starter generator 218 and the APU 214 as well as associated ducting. The cowling 204 may have a cutout (reference symbol 406 in FIG. 4) accommodating an APU inlet filter assembly 215. The other components of the rotorcraft are shown for illustrative purposes only and are not otherwise part of the present disclosure.

INTRODUCTION TO THE INVENTION

The embodiments described throughout this disclosure provide numerous technical advantages, including handholds disposed on the cowling and operating also as maintenance position bumpers.

Example embodiments that may be used to implement the operation of the handholds are described below with more particular reference to the remaining FIGURES.

Figure 3:
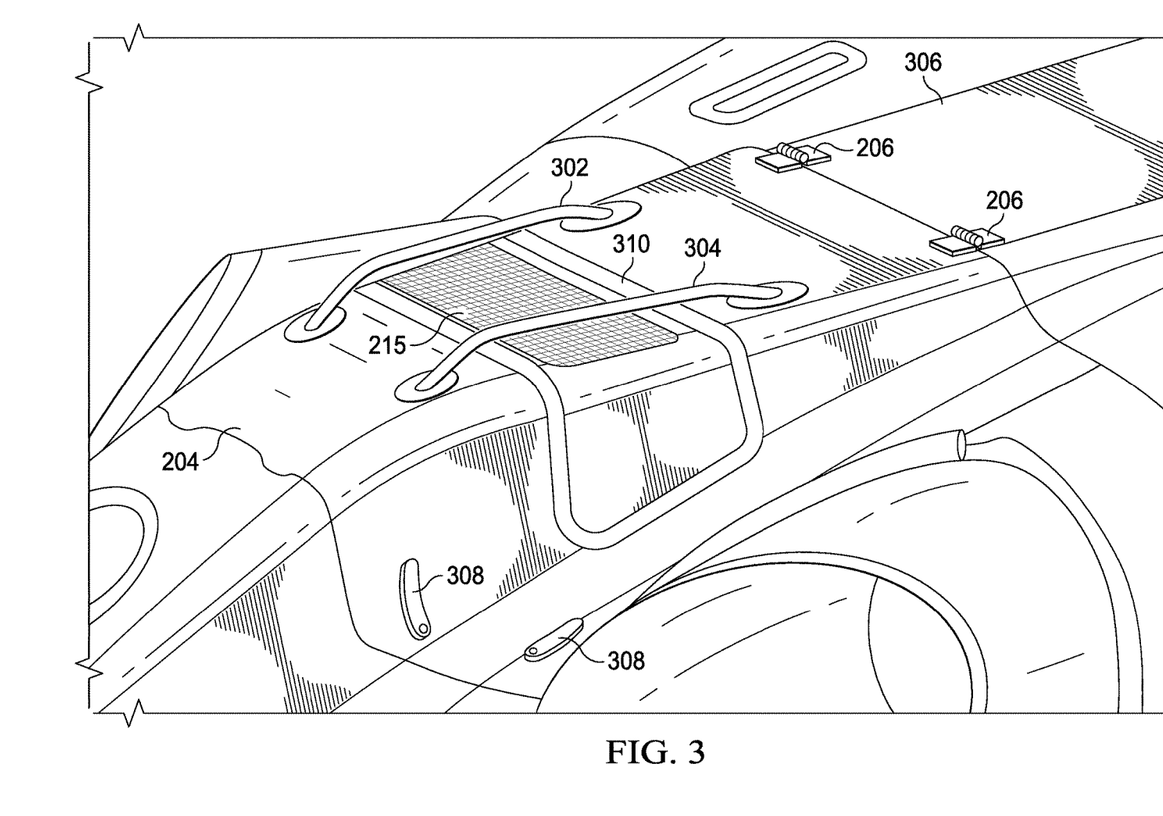
FIG. 3 illustrates a perspective top view of an example cowling according to embodiments of the present disclosure in a closed position.
Figure 4:
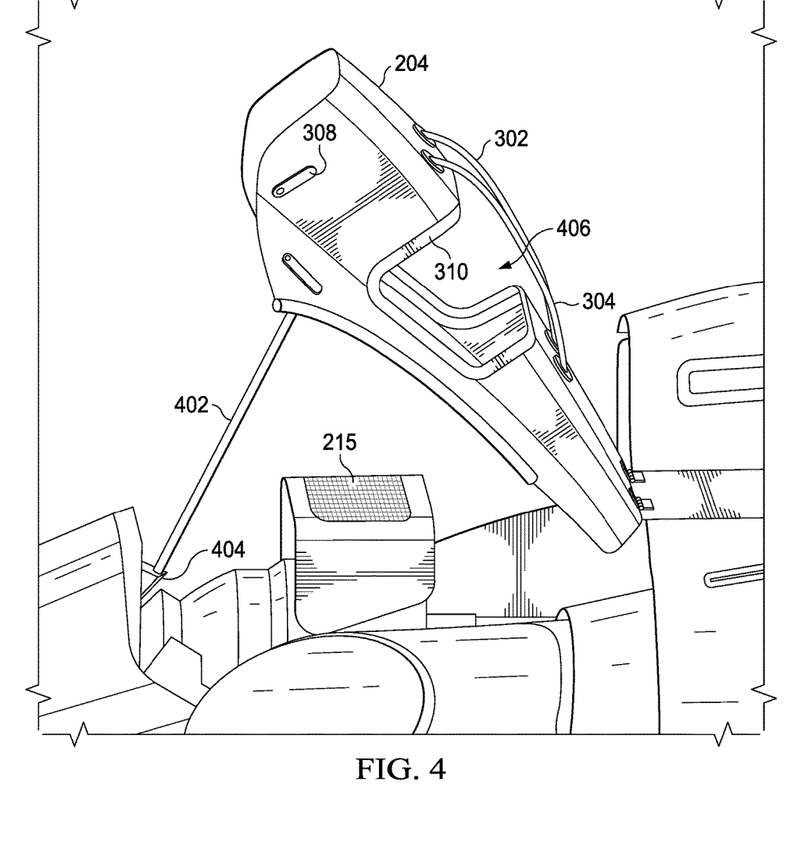
FIG. 4 illustrates the example cowling of FIG. 3 in a first partially open position.

FIG. 3 shows in a perspective view on the top of the rotorcraft an example embodiment of a cowling 204 that is articulated by way of hinges 206 with respect to a top section 306 of the fuselage 106 of the rotorcraft. In the closed position illustrated in FIG. 3, the cowling 204 may be secured to stationary parts of the rotorcraft by way of for example latches 308. The cowling has an opening 406 (shown in more detail in FIG. 4) which may cover, for example, an APU inlet filter assembly 215. The filter assembly 215 may be attached either to the cowling 204 (not shown) or preferably to reduce the weight of the cowling 204, for example, to the APU 214 or another part of the fuselage (as shown in FIG. 4). The filter assembly 215 may be sealed against the opening 406 by a wrap-around seal 310. FIG. 3 furthermore shows two handholds 302, 304 attached at their respective ends to a top portion of the cowling 204. The handholds 302, 304 bridge the opening 406 and operate as structural reinforcement around the opening 406 and also serve as scampering handles, allowing maintenance personnel to use, for example, the foot ledge 202 (FIG. 2) for climbing up to a walk platform, for example to perform maintenance on the aft of the rotorcraft.

Accordingly, the handholds 302, 304 obviate the need for additional structural reinforcement across the opening 406, thus optimizing (reducing) the total area required by. A comparable opening without the handholds 302, 304 would require additional structural reinforcement by a longitudinal element extending across the opening 406 which could then impair the airflow path to the inlet of the APU. The offset of the handholds 302, 304 from the cowling surface sufficiently separates the handholds from the inlet air path so as not to obstruct the inlet of the APU.

The cowling may be pivoted upward into a first partially open position by releasing the latches 308, as shown in FIG. 4, which may allow an at least cursory inspection of the rotorcraft components located underneath the cowling. In the first partially open position the cowling 204 may be held in place by a rod 402 having a free end that cooperates and locks with a gust-proof receptacle 404 having a key slot 504, shown in more detail in FIG. 5. The other end of the rod 402 may be articulated on the cowling 204.

Figure 5:
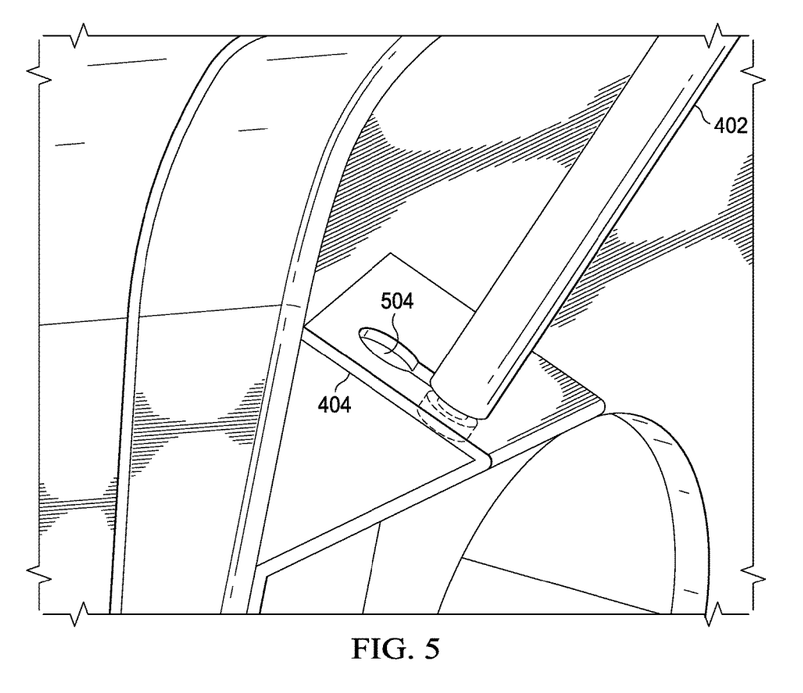
FIG. 5 illustrates details of the hold-open rod and the gust proof receptacle for holding the cowling in the first partially open position.

FIG. 5 shows the receptacle 404 in greater detail. The free end of the rod 402 engages with the key slot 504. For this purpose, the free end of the rod 402 has a, for example, mushroom-shaped end portion with a diameter that is larger than the width of the slot 504, but smaller than the diameter at the end of the key slot 504, thus allowing insertion of the mushroom-shaped end portion into the end hole of the key slot 504. The cooperation between the key slot 504 and the mushroom-shaped end portion of the rod 402 prevents the rod 402 from being inadvertently disengaged from the receptacle 404, for example when the cowling 204 is exposed to wind forces.

Figure 6:
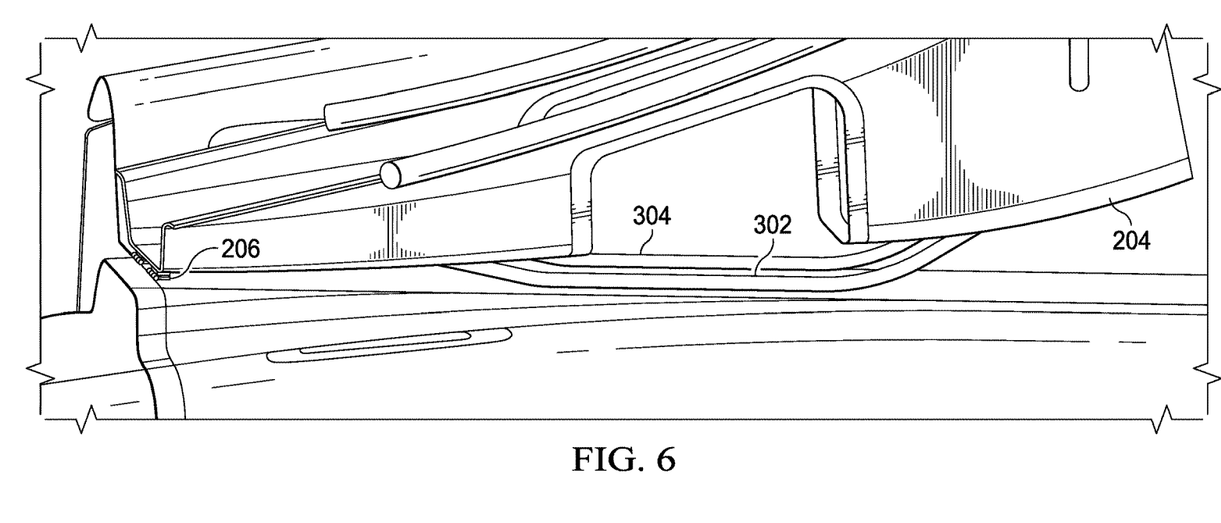
FIG. 6 illustrates the example cowling of FIG. 3 in a second fully open position.

To provide a larger unobstructed access to assemblies of the rotorcraft located underneath the cowling 204, the cowling 204 may thereafter be pivoted upward about the hinges 206 all the way into a fully forward position, as illustrated in FIG. 6. In this fully forward position, the handholds 302, 304 rest on the top surface 306 of the fuselage 106. To more evenly distribute the weight of the cowling 204 on the top surface 306 of the fuselage 106, the elongated top portion 714 (shown in FIG. 7) of the handholds 302, 304 should bear against the top surface 306 of the fuselage 106 over a substantial portion of the length of the respective top portion. This is accomplished by shaping the elongated top portion 714 such that a tangent T of the elongated top portion 714 of the handhold 304 extends through the respective hinge 206.

Figure 7:
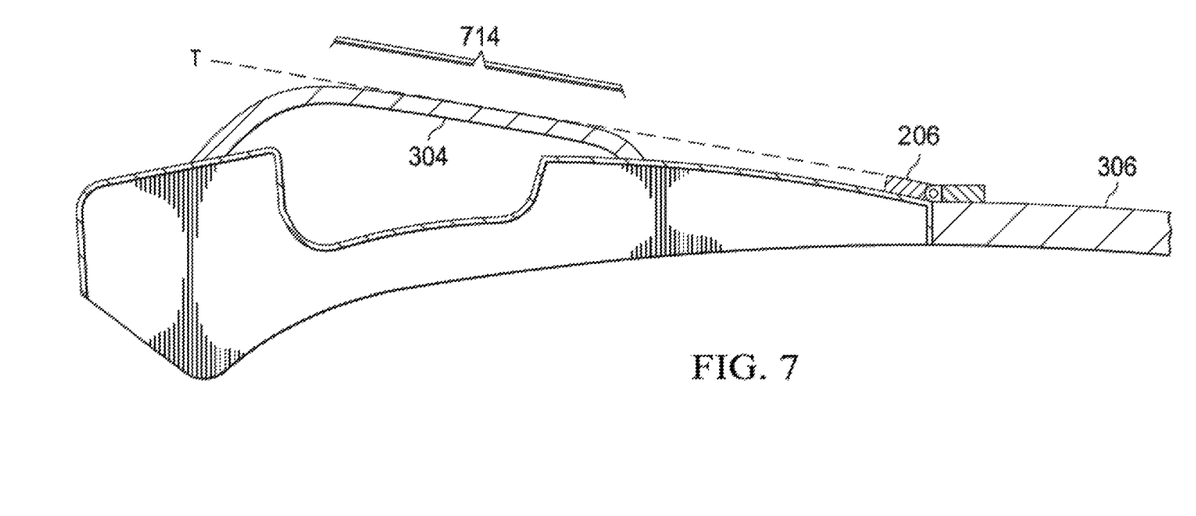
FIG. 7 illustrates orientation of handhelds on the cowling for optimal contact with a top surface of the fuselage in the second fully open position.

FIG. 7 shows a cross-section though the cowling 204 taken along a line parallel to a handhold 304. This angle of the tangent T determines the shape of the handhold 304 and the spacing of the end points of the handhold 304 from the top surface of the cowling 204.

The cowling 204 may be constructed, for example, from aluminum alloy 6061 with a specific density of approximately 2.70 g/cm$^3$. Aluminum has greatly diminished in use though, from 80 percent of airframes in 1950 to about 15 percent aluminum and aluminum alloys today for airframe construction. Aluminum has been replaced mainly by non-metallic aircraft materials, such as reinforced plastics and advanced composites, such as carbon fiber reinforced polymer (CFRP). Carbon fiber reinforced polymers have a density of approximately 1.6 g/cm$^3$. They have the advantage of high strength-to-weight ratio, modulus (stiffness to density ratio) 3.5 to 5 times that of steel or aluminum, longer life than metals, higher corrosion resistance, tensile strength 4 to 6 times that of steel or aluminum, and greater design flexibility. Furthermore, the bonded construction eliminates joints and fasteners, making these components easy to repair. Accordingly, cowlings constructed from composites will be lighter and, in spite of the reduced weight, will be stronger than comparable components made from aluminum alloys.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. A cowling for a rotorcraft, wherein the cowling is hinged on a stationary part of an airframe of the rotorcraft and pivotable from a closed position into a first partially open position and into a second fully open position, the cowling comprising:
   a rod articulated on the cowling and having a free end configured to releasably engage with the airframe to hold the cowling in the first position; and
   at least one handhold attached to an exterior surface of the cowling, wherein the at least one handhold is configured to rest on a top portion of the airframe in the fully open position.

2. The cowling of claim 1, wherein the airframe comprises a key slot configured to engage with the free end of the rod in the first position.

3. The cowling of claim 1, wherein the at least one handhold comprises an elongated, substantially straight section that is shaped and angled with respect to an exterior contact surface of the cowling such that a tangent extending through the straight section extends through a hinge connecting the cowling to the top portion of the airframe.

4. The cowling of claim 1, wherein in the closed position, the cowling covers a component of the rotorcraft.

5. The cowling of claim 4, further comprising an opening aligned with an air inlet of the component of the rotorcraft.

6. The cowling of claim 5, wherein the at least one handhold bridges the opening in a lengthwise direction of the rotorcraft.

7. The cowling of claim 5, wherein the opening is arranged to seal against a filter of the air inlet.

8. The cowling of claim 1, wherein the component comprises an auxiliary power unit (APU) of the rotorcraft.

9. The cowling of claim 1, further comprising one or more latches to secure the cowling on the airframe in the closed position.

10. The cowling of claim 1, wherein the cowling is constructed of a composite material.

11. A rotorcraft comprising
    a cowling hinged on a stationary part of an airframe of the rotorcraft and pivotable from a closed position into a first partially open position and into a second fully open position, the cowling comprising
    a rod articulated on the cowling and having a free end configured to releasably engage with the airframe to hold the cowling in the first position; and
    at least one handhold attached to an exterior surface of the cowling, wherein the at least one handhold is configured to rest on a top portion of the airframe in the fully open position.

12. The rotorcraft of claim 11, wherein the free end of the rod releasably engages with a key slot.

13. The rotorcraft of claim 11, wherein the at least one handhold comprises an elongated, substantially straight section that is shaped and angled with respect to an exterior surface of the cowling such that a tangent extending through the straight section extends through a hinge connecting the cowling to the top portion of the airframe.

14. The rotorcraft of claim 11, wherein the at least one handhold bridges in a lengthwise direction of the rotorcraft an opening disposed in the cowling.

15. The rotorcraft of claim 14, wherein the opening is configured to provide an air inlet of the component of the rotorcraft.

16. The rotorcraft of claim 11, further comprising a plurality of latches configured to secure the cowling on the airframe in the closed position.

17. The rotorcraft of claim 11, wherein the cowling is constructed of a composite material.

18. A method for facilitating access to a component of a rotorcraft disposed underneath a cowling, the method comprising:
    allowing maintenance personnel to grasp at least one handhold attached to an exterior surface of the cowling and climb up to a platform;
    opening the cowling to a first partially open position and supporting the cowling on an airframe of the rotorcraft in the first partially open position; and
    opening the cowling from the first position to a second fully open position, wherein in the second position the at least one handhold rests on a top portion of the airframe.

19. The method of claim 18, wherein the cowling is supported on the airframe in the first partially open position by a rod articulated on the cowling and engaging with a key slot disposed on the airframe.

20. The method of claim 18, wherein the at least one handhold comprises an elongated, substantially straight section that is shaped and angled with respect to an exterior contact surface of the cowling such that a tangent extending through the straight section extends through a hinge connecting the cowling to the top portion of the airframe.

\* \* \* \* \*